United States Patent Office 3,164,130
Patented Jan. 5, 1965

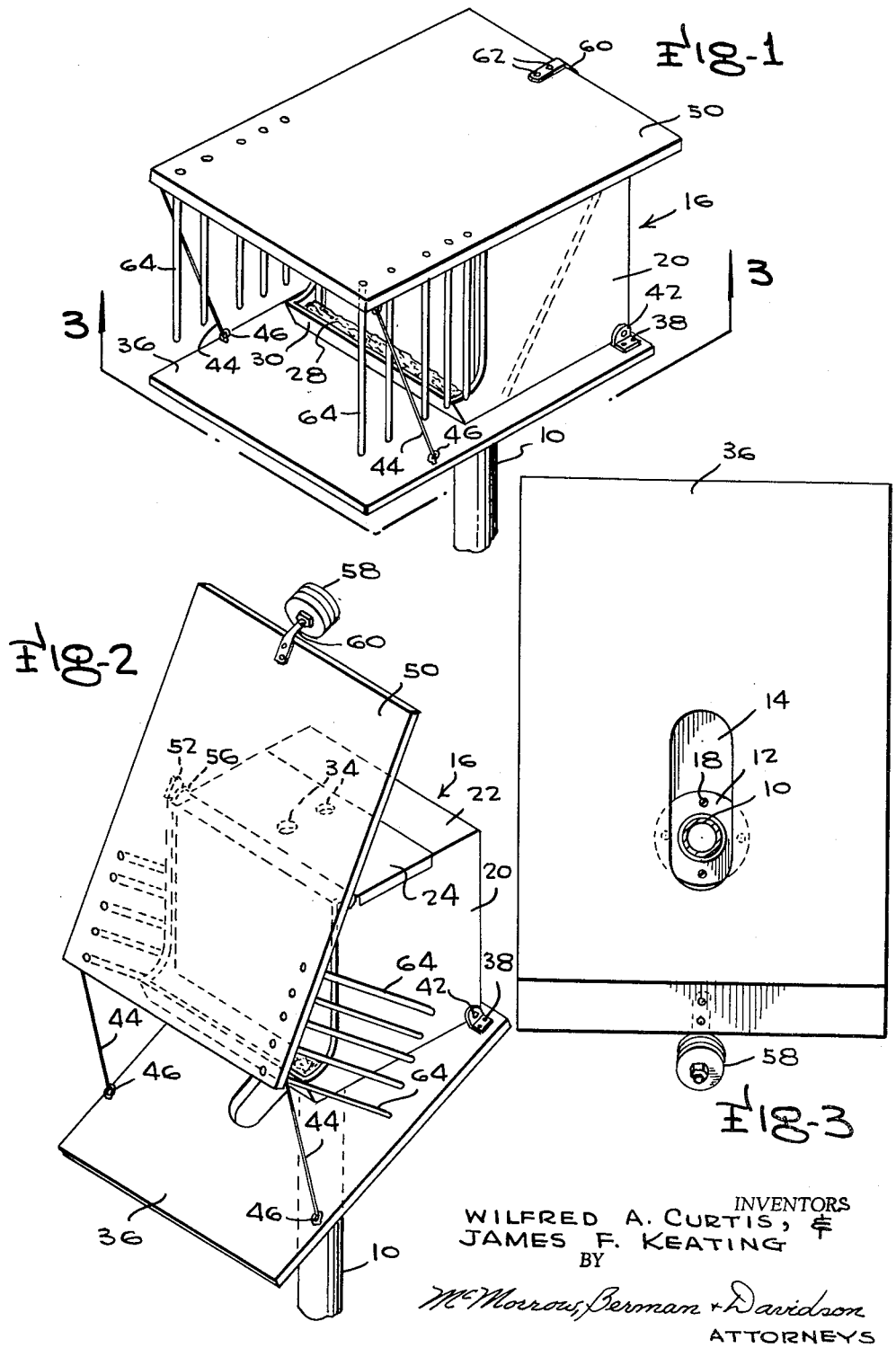

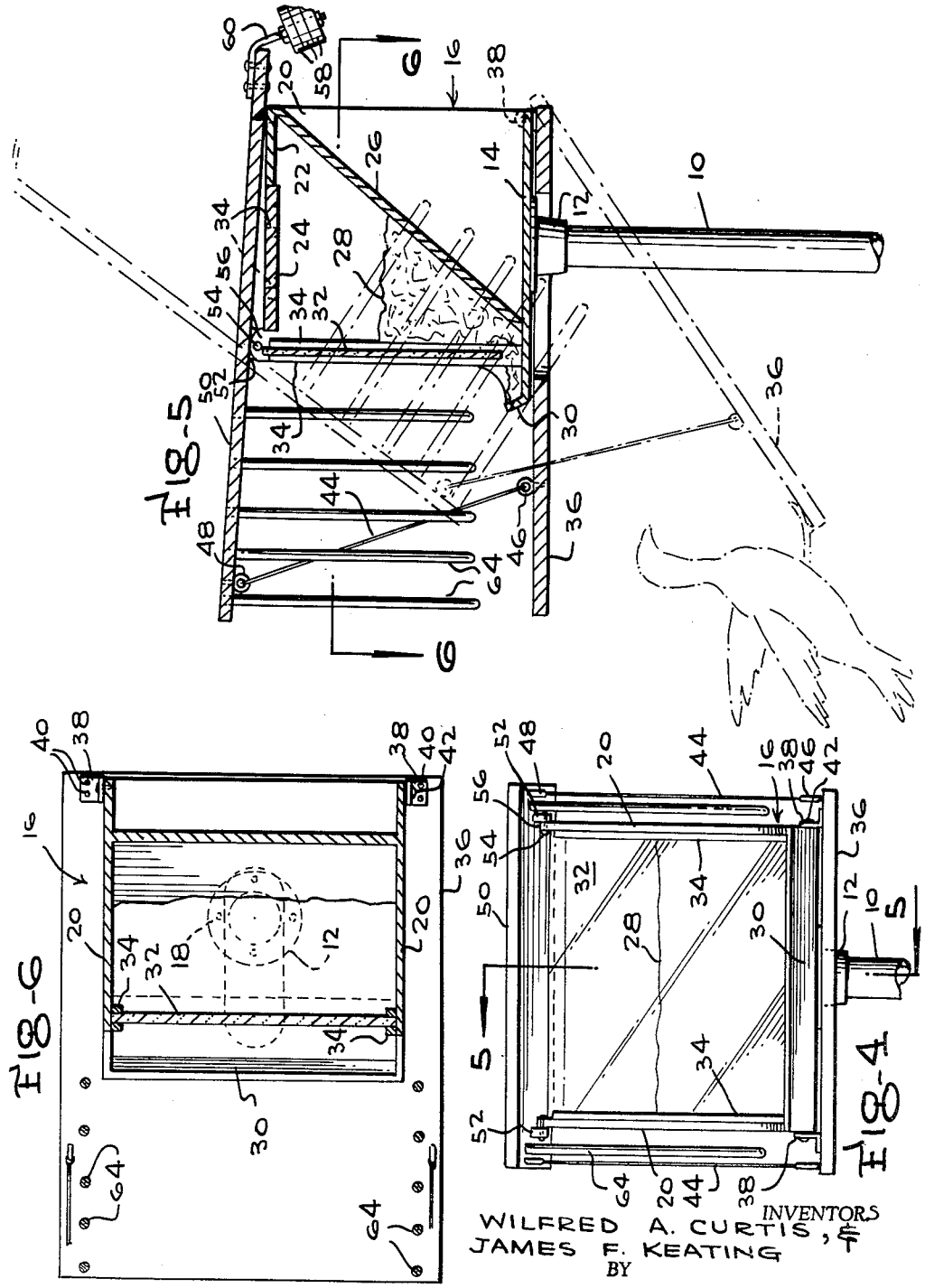

3,164,130
BIRD FEEDER
Wilfred A. Curtis, Depot St., North Woodstock, N.H., and
James F. Keating, Jack O'Lantern, Woodstock, N.H.
Filed Oct. 11, 1963, Ser. No. 315,625
3 Claims. (Cl. 119—51)

This invention relates to a feeding station for birds, and particularly small birds.

Where bird food is left in the open, unattended, or unguarded, the food is almost certain to be eaten by the larger species of birds, such as crows, pigeons, and the like, to the detriment of smaller species, and it is a general object of the present invention to correct this condition.

More particularly, it is an object to provide a bird-feeding station having mechanism which discourages or prevents feeding by birds of a weight exceeding a certain, predetermined value.

Yet another object is to provide a device capable of accomplishing the foregoing objects, and which, in addition, provides a degree of agitation to the food stored therein, for improved flow of the food.

The foregoing objects are attained by the present invention, which may be briefly described as comprising a gravity-feed bin, an articulated platform, and a pivoted closure member, movable to bin-closing position upon descent of the platform, the closure member being counter-weighted for normal positioning in bin-exposing position.

For a more detailed description of the invention, reference is made to the following specification, as illustrated in the drawings, in which:

FIGURE 1 is a perspective view of the feeding station, with the parts in normal position, only a fragment of the supporting standard being shown, FIGURE 2 is a view similar to FIGURE 1, showing the platform depressed, and the top plate correspondingly tilted to bin-obstructing position, FIGURE 3 is a bottom plan view of the feeding station, as seen from the plane of the line 3—3 of FIGURE 1, including a transverse section through the standard, FIGURE 4 is a front elevational view of the station shown in FIGURE 1, FIGURE 5 is a vertical, sectional view, through the structure, taken on the plane of the line 5—5 of FIGURE 4, and FIGURE 6 is a horizontal, sectional view, taken on the plane of the line 6—6 of FIGURE 5.

Referring to the drawings by characters of reference there is shown a fragment of supporting, standard, 10, with a flanged cap 12 on its upper end, supporting the bottom or floor 14, of a generally rectangular open front storage and dispensing bin, indicated as a whole by the numeral 16, and secured to said bottom as by screws 18 (FIG. 3). The bin, which may be fabricated from plastic, wood, or other suitable material, is shown in the preferred form as comprising a pair of parallel, vertical side walls 20, a partial fixed rear top wall section 22, a removable forward top wall section 24, and a forwardly declining bottom panel 26, extending between the side walls 20, defining a storage compartment for the grain or other bird food, 28. Bottom 14 extends beyond the front edges of the side walls 20, and terminates in an upwardly inclined flange 30.

A front closure for the bin 16 is constituted by a perpendicular glass panel 32, so that the contents of the bin may be visible, and this panel is preferably removable, being slidably mounted in vertical channel 34 on the inner faces of side walls 20 at the forward ends thereof. The removable top wall section 24 may be slide-mounted, hinge-mounted, or simply rest upon the top edges of the side walls 20, and may be provided with finger holes 34, for handling.

A normally horizontal platform 36, for supporting a bird in feeding position, underlies the bin and is longer than and extends forwardly beyond the bin 16, and is hinged, at its rear end, to the rear end of the bin, for swinging from a normal, horizontal position, shown in solid lines in FIG. 5, to a forwardly declining position shown in phantom lines. Angle brackets 38, secured to platform 36 as by screws 40, are pivoted to bin side walls 20 by rivet pins 42. An elongate opening 43, located centrally of platform 36, provides clearance for standard 10 in all positions of the platform.

Platform 36 is held in normal, horizontal position by wires 44, anchored, at their lower ends, on the forward part of the platform 36, and, at their upper ends, to eyes 48 fixed to the underside of the top or closure plate, at the forward end thereof. The closure plate 50 is normally in a substantially horizontal position, overlying the top of bin 16, and extending forwardly therefrom, and may be substantially coextensive with the platform 36.

Top plate 50 is also supported, medially of its length, by a pair of depending ears 52, pivoted by pins 54 to ears 56, extending upwardly from the bin side walls 20, at their front ends. A plurality of counterweights 58, is carried on a bent rod 60, which has a flat portion secured upon top plate 50, at its rear end, by screws 62, and serves to hold the top plate in its normal, horizontal position, with rear part of the top plate resting upon the bin 16, and with platform 36 correspondingly drawn up into contact with the bottom wall 14 of the bin. Spring means could be employed, in lieu of counterweights.

With the structure thus far described, it will be seen that birds of a weight less than sufficient to overcome the counterweights 58 may alight on the platform 36 without producing any movement thereof which would alarm them or interfere with their feeding. However, alighting of birds exceeding a certain, predetermined weight upon the platform 36 will overcome the effect of the counterweight, so that the platform 36 is swung downwardly, as shown in phantom lines in FIGURE 5. Not only is this sufficiently disconcerting, if not alarming to the bird, to cause him to abandon his purpose and depart the scene, but also positively prevents his feeding, by virtue of the obstructive action of top plate 50, which swings down into a position where it effectively closes off the open front of the bin 16. A repeated attempt will merely add to the frustration of the proscribed bird.

In order to ensure that over-weight birds land in a position to produce maximum depression of the swinging platform 36, side fences are provided, in the form of series of pickets 64, suitably secured to and depending from the underside of top plate 50. These limit entry to a path leading across the forward edge of the platform 36. In addition, the side fences prevent any attempt of the over-weight birds to defeat the system by hovering while feeding.

Another desirable feature of the device is that the food in the bin 16 is agitated from time to time, by contact shocks during operation of the swinging parts, especially on the return of the platform upwardly from a depressed position.

While a certain, preferred embodiment has been shown and described, various modifications will be apparent, in the light of this disclosure, and the invention should not, therefore, be deemed as limited, except insofar as shall appear from the spirit and scope of the appended claims.

We claim:
1. A bird feeding station comprising a support, an open front bin having a bottom wall fixed upon the support, said bin having means active to feed bird food forwardly gravitationally toward its open front, said bin having side walls, a normally horizontal platform positioned beneath and extending forwardly beyond the open front of the bin, said platform being hinged, at its rear end to the bin, at the rear end of the bin, a normally horizontal top plate overlying the bin and extending forwardly beyond the open front of the bin, said top plate being pivoted intermediate its ends on the bin side walls adjacent to the open front of the bin, said top plate being arranged to be swung forwardly and downwardly to closure relation to the open front of the bin, automatic elevating means operatively connected to the top plate for returning the top plate to horizontal position from a depressed position, and connecting means extending between and connected to the top plate and the platform at locations near their forward ends.

2. A bird feeding station according to claim 1, wherein said top plate has pendant protective fence means fixed thereto and reaching substantially to and spaced above the platform and extending from the forward end of the platform to the open front of the bin.

3. A bird feeding station according to claim 1, wherein the bin side walls have vertical channels on their inner sides at said open front, said channels terminating at levels spaced above the bin bottom wall, and a transparent panel slidably and removably engaged in the channels.

References Cited in the file of this patent
UNITED STATES PATENTS

| | | |
|---|---|---|
| 2,230,058 | Hornung | Jan. 28, 1941 |
| 2,918,901 | Poulsen | Dec. 29, 1959 |
| 3,104,649 | Slaven | Sept. 24, 1963 |